US008249649B2

(12) United States Patent
Tseng

(10) Patent No.: US 8,249,649 B2
(45) Date of Patent: Aug. 21, 2012

(54) MOBILE DEVICE CONFIGURED TO OPERATE ON MULTIPLE DIFFERENT NETWORKS

(75) Inventor: Erick Tseng, San Francisco, CA (US)

(73) Assignee: Google Inc., Mountain View, CA (US)

( * ) Notice: Subject to any disclaimer, the term of this patent is extended or adjusted under 35 U.S.C. 154(b) by 231 days.

(21) Appl. No.: 12/829,909

(22) Filed: Jul. 2, 2010

(65) Prior Publication Data

US 2012/0003973 A1 Jan. 5, 2012

(51) Int. Cl.
*H04M 1/00* (2006.01)

(52) U.S. Cl. ............. 455/552.1; 455/436; 455/432.1; 455/435.2; 370/331

(58) Field of Classification Search ............ 455/550.1, 455/552.1, 553.1, 432.1, 435.2, 436–444; 370/331
See application file for complete search history.

(56) References Cited

U.S. PATENT DOCUMENTS

| | | | |
|---|---|---|---|
| 6,072,791 A | 6/2000 | Nagase et al. | |
| 6,745,022 B2 | 6/2004 | Knox | |
| 7,333,955 B2 | 2/2008 | Graves et al. | |
| 7,539,156 B2 | 5/2009 | Leung et al. | |
| 2006/0143098 A1 | 6/2006 | Lazaridis | |
| 2008/0064367 A1 | 3/2008 | Nath et al. | |
| 2008/0146232 A1 | 6/2008 | Knisely | |
| 2008/0232574 A1 | 9/2008 | Baluja et al. | |
| 2008/0318616 A1* | 12/2008 | Chipalkatti et al. | 455/550.1 |
| 2009/0249247 A1 | 10/2009 | Tseng et al. | |
| 2009/0270071 A1* | 10/2009 | Kuo et al. | 455/411 |
| 2009/0325607 A1 | 12/2009 | Conway et al. | |
| 2010/0031186 A1 | 2/2010 | Tseng et al. | |
| 2010/0100839 A1 | 4/2010 | Tseng et al. | |

FOREIGN PATENT DOCUMENTS

| | | |
|---|---|---|
| WO | 2005122601 A2 | 12/2005 |
| WO | 2010047988 A1 | 4/2010 |
| WO | 2012003464 A1 | 1/2012 |

OTHER PUBLICATIONS

CDG, "Frequently Asked Questions (FAQ) on MEID and Expanded UIMID (E-UIMID)", Version 3.0, Jun. 2008, 10 pages.
Net10 Wireless, "Net10 Prepaid Cell Phone Plans", Downloaded from http://www.compare-prepaid-cell-phones.com/Net10.html on Jan. 18, 2010, 6 pages.
International Search Report for International Application No. PCT/US2011/042828, mailed Oct. 18, 2011, 13 pages.
Sanyal, "Implementation of MEID for Mobile Stations in CDMA Network", IEEE 3rd International Conference on Communication Systems Software and Middleware and Workshops, Jan. 6, 2008, 5 pages.

* cited by examiner

*Primary Examiner* — Vladimir Magloire
(74) *Attorney, Agent, or Firm* — Brake Hughes Bellermann LLP

(57) ABSTRACT

An apparatus includes a code division multiple access (CDMA) antenna that is configured to transmit and receive communication signals. The apparatus includes a memory that is configured to store multiple mobile equipment identifiers (MEIDs), multiple activation protocols and instructions, where each MEID includes an identifier that is uniquely recognizable on one of multiple networks and where the activation protocols include protocols for uniquely activating the apparatus on one of multiple different networks each of which have different communication protocols. The apparatus includes a processor that is coupled to the CDMA antenna and to the memory and that is configured to execute the instructions to enable a user to select a network from the multiple different networks on which to activate and operate the apparatus and activate and operate the apparatus on a selected network using an MEID recognizable by the selected network and the activation protocol for the selected network.

32 Claims, 9 Drawing Sheets

MOBILE DEVICE CONFIGURED TO OPERATE ON MULTIPLE DIFFERENT NETWORKS

TECHNICAL FIELD

This description relates to a mobile device that is configured to operate on multiple different networks.

BACKGROUND

A mobile device may only operate on a specific type of network that is limited to a single carrier. For example, a cellular phone may be configured to operate on a single code division multiple access (CDMA) network that is operated by a single carrier. Even if the network is operated by more than one carrier, the phone may be limited to being activated on that single CDMA network. The user of the cellular phone may want to switch networks and carriers and use the cellular phone on a different network, which may be operated by a different carrier. For instance, the user of the cellular phone may want to switch to a CDMA network operated by a different CDMA carrier or to a global system for mobile communications (GSM) network operated by a GSM carrier; however, the user is unable to switch from the single CDMA network to a different network because the phone is limited to working on a single CDMA network.

It may desirable to provide users with devices which may be activated and used on multiple different networks.

SUMMARY

This document describes devices, systems and techniques to enable a mobile device to be activated and operated on multiple different networks. In general, a mobile device may be configured to operate on one of multiple different networks, where each of the different networks has a different communication protocol for activating and/or using the mobile device. For example, a mobile device may be configured to operate on multiple different code division multiple access (CDMA) networks, where each of the CDMA networks has a different activation and/or communication protocol. The mobile device may allow a user to select which one of the multiple CDMA networks on which to activate and operate the mobile device. The mobile device may include a CDMA antenna that is configured to operate at multiple different frequencies. A memory in the mobile device may include multiple mobile equipment identifiers (MEIDs) and multiple activation protocols, where each of the MEIDs are uniquely recognizable on a network. The activation protocols may include different protocols that are used by the different CDMA networks to activate the mobile device on a particular CDMA network.

When a user selects a particular CDMA network, which may be associated with a particular carrier, the mobile device selects an appropriate MEID from the memory, which is uniquely recognizable by the selected CDMA network. The mobile device also selects an activation protocol from the memory, which is used to activate the mobile device on the selected network.

Also, the mobile device may be switched from one network to another network. For example, the user may decide to switch the mobile device from one CDMA network to another CDMA network. The mobile device is configured to receive the selection from the user and to process the selection by using an MEID and activation protocol appropriate for the new CDMA network and to activate and operate the mobile device on the new CDMA network.

Also, the mobile device may be switched from one type of network to a different type of network. For example, the mobile device may be configured to switch from a CDMA network to a global system for mobile communications (GSM) network. The mobile device may be configured with access point configurations (APNs) to activate the mobile device on different GSMs. The mobile device also may be configured to accept and recognize a subscriber identity module (SIM) chip to enable the device to be activated on a selected GSM network. In another example, the mobile device may be configured to switch from a GSM network to a CDMA network.

According to one general aspect, an apparatus includes a code division multiple access (CDMA) antenna that is arranged and configured to transmit and receive communication signals. The apparatus includes a memory that is configured to store multiple mobile equipment identifiers (MEIDs), multiple activation protocols and instructions, where each MEID includes an identifier that is uniquely recognizable on one of a plurality of networks and where the activation protocols include protocols for uniquely activating the apparatus on one of a plurality of different networks each of which have different communication protocols. The apparatus includes a processor that is operably coupled to the CDMA antenna and to the memory and that is arranged and configured to execute the instructions stored on the memory to enable a user to select a network from the multiple different networks on which to activate and operate the apparatus and activate and operate the apparatus on a selected network using one of the MEIDs recognizable by the selected network and the activation protocol for the selected network.

Implementations may include one or more of the following features. For example, the CDMA antenna may include a dual band CDMA antenna that is configured to operate at multiple different frequencies and the processor may be configured to execute the instructions stored on the memory to operate the dual band CDMA antenna at a frequency for operation on the selected network. In one exemplary implementation, the processor may be configured to execute the instructions stored on the memory to activate the apparatus on the selected network over-the-air. Alternatively and/or additionally, the processor may be configured to execute the instructions stored on the memory to activate the apparatus on the selected network over a wireless local area network.

The processor may be configured to execute instructions stored on the memory to enable a user to switch from the selected network to a different network and activate and operate the apparatus on the different network using a different MEID of the MEIDs recognizable by the different network and the activation protocol for the different network. In one exemplary implementation the selected network may include a first CDMA network and the different network may include a second CDMA network, where the second CDMA network is different from the first CDMA network.

The apparatus may further include a global system for mobile communications (GSM) antenna, where the memory further includes multiple access point network (APN) configurations, where each of the APN configurations include protocols for uniquely activating the apparatus on one of a plurality of different GSM networks each of which have different communication protocols. The processor may be configured to execute the instructions stored on the memory to enable a user to switch from the selected network to a GSM network, recognize a presence of a subscriber identity module (SIM) chip associated with a specific GSM network, and activate and operate the apparatus on the specific GSM network using the APN configuration for the specific GSM network. In one exemplary implementation, the GSM antenna may include a quad band GSM antenna.

In another general aspect, an apparatus includes a first antenna that is arranged and configured to transmit and receive communication signals on at least a first network, a second antenna that is arranged and configured to transmit and receive communication signals on at least a second network, where the second network is a different network than the first network and the second network has a different communication protocol than the first network. The apparatus includes a memory that is configured to store protocols and instructions to activate and operate the apparatus on the first network and the second network and a processor that is operably coupled to the first antenna, the second antenna and the memory and that is arranged and configured to execute the instructions stored on the memory to enable a user to select one of the first network and the second network on which to activate and operate the apparatus and activate and operate on the selected network using the protocols for the selected network.

Implementations may include one or more of the following features. For example, the first antenna may include a code division multiple access (CDMA) antenna and the second antenna may include a global system for mobile communications (GSM) antenna. The processor may be configured to execute instructions stored on the memory to enable a user to switch from the selected network to a different network from the first network and the second network and activate and operate the apparatus on the different network. In one exemplary implementation, the selected network may include a code division multiple access (CDMA) network and the different network may include a global system for mobile communications (GSM) network. In another exemplary implementation, the selected network may include a global system for mobile communications (GSM) network and the different network may include a code division multiple access (CDMA) network.

In another general aspect, a recordable storage medium may have recorded and stored thereon instructions that, when executed, perform the actions of enabling a user to select a network from multiple different networks, each of which have different communication protocols, on which to activate and operate a mobile device and activating and operating the mobile device on a selected network using one of multiple mobile equipment identifiers (MEIDs) and one of multiple activation protocols stored on the mobile device and recognizable by the selected network.

Implementations may include one or more of the following features. For example, the instructions that, when executed, perform the action of activating and operating the mobile device may include instructions that, when executed, perform the action of activating the mobile device on the selected network over-the-air. Alternatively and/or additionally, the instructions that, when executed, perform the action of activating and operating the mobile device may include instructions that, when executed, perform the action of activating the mobile device on the selected network over a wireless local area network.

In one exemplary implementation, the selected network may include a code division multiple access (CDMA) network. The recordable storage medium of may further include instructions that, when executed, perform the actions of enabling a user to switch from the selected network to a different network and activating and operating the mobile device on the different network using a different MEID recognizable by the different network and the activation protocol for the different network. In one exemplary implementation, the selected network may include a first code division multiple access (CDMA) network and the different network may include a second CDMA network, where the second CDMA network is different from the first CDMA network.

In another general aspect, a method includes enabling, using a processor, a user to select a network from multiple different networks, each of which have different communication protocols, on which to activate and operate a mobile device and activating and operating, using the processor, the mobile device on a selected network using one of multiple mobile equipment identifiers (MEIDs) and one of multiple activation protocols stored on the mobile device and recognizable by the selected network.

Implementations may include one or more of the following features. For example, activating and operating the mobile device may include activating, using the processor, the mobile device on the selected network over-the-air. Alternatively and/or additionally, activating and operating the mobile device may include activating, using the processor, the mobile device on the selected network over a wireless local area network.

In one exemplary implementation, the selected network may include a code division multiple access (CDMA) network. The method may further include enabling, using the processor, a user to switch from the selected network to a different network and activating and operating, using the processor, the mobile device on the different network using a different MEID recognizable by the different network and the activation protocol for the different network. In one exemplary implementation, the selected network may include a first code division multiple access (CDMA) network and the different network may include a second CDMA network, where the second CDMA network is different from the first CDMA network.

In another general aspect, a recordable storage medium may have recorded and stored thereon instructions that, when executed, perform the actions of enabling a user to select between at least one code division multiple access (CDMA) network and at least one global system for mobile communications (GSM) network, on which to activate and operate a mobile device and activating and operating the mobile device on the selected network using protocols stored on the mobile device for the selected network.

Implementations may include one or more of the following features. For example, the recordable storage medium may further include instructions that, when executed, performs the actions of enabling a user to switch from the selected network to a different network and activating and operating the mobile device on the different network. In one exemplary implementation, the selected network may include the CDMA network and the different network include the GSM network. In another exemplary implementation, the selected network may include the GSM network and the different network may include the CDMA network.

In another general aspect, a method includes enabling, using a processor, a user to select between at least one code division multiple access (CDMA) network and at least one global system for mobile communications (GSM) network, on which to activate and operate a mobile device and activating and operating, using the processor, the mobile device on the selected network using protocols stored on the mobile device for the selected network.

Implementations may include one or more of the following features. For example, the method may further include enabling, using the processor, a user to switch from the selected network to a different network and activating and operating, using the processor, the mobile device on the different network. In one exemplary implementation, the selected network may include the CDMA network and the different network may include the GSM network. In another exemplary implementation, the selected network may include the GSM network and the different network may include the CDMA network.

The details of one or more implementations are set forth in the accompanying drawings and the description below. Other features will be apparent from the description and drawings, and from the claims.

DETAILED DESCRIPTION

This document describes devices, systems and techniques to enable a mobile device to be activated and operated on multiple different networks, where each of the different networks has a different communication protocol for activating and/or using the mobile device. This document also describes devices, systems and techniques for enabling a user of a mobile device to select a network, from among multiple different networks, on which to activate and operate the mobile device. Also, this document describes devices, systems and techniques for enabling a user to switch the operation of the mobile device from one network to a different network.

Figure 1:
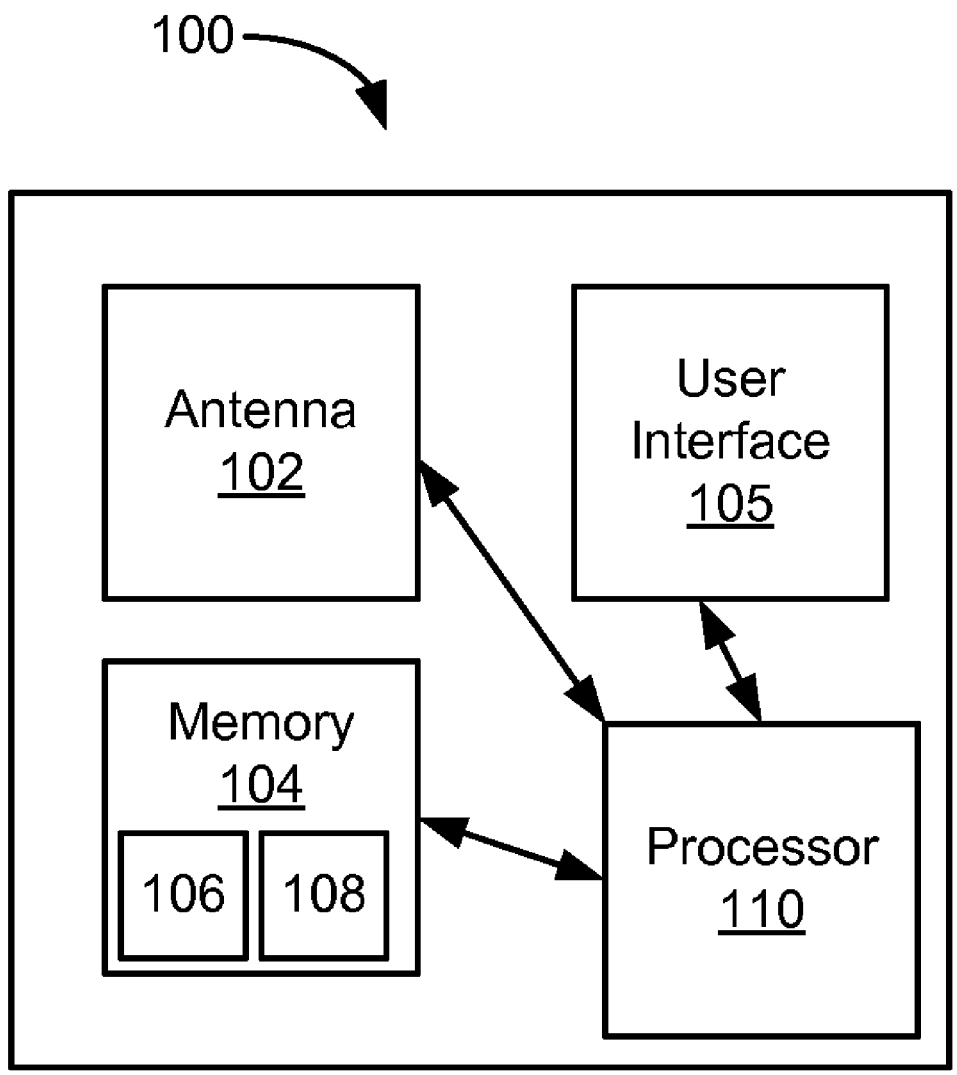
FIG. 1 is an exemplary block diagram of an exemplary mobile device.

Referring to FIG. 1, an exemplary block diagram of a mobile device 100 is illustrated. The mobile device may include exemplary components such as an antenna 102, a memory 104, a user interface 105 and a processor 110. The antenna 102, the memory 104, and the user interface 105 may be operably coupled to the processor 110. The mobile device 100 may include other components (not shown in this figure). The other components are described in more detail below in conjunction with other figures. The mobile device 100 may include any type of device that is capable of communicating over a network.

The antenna 102 may be arranged and configured to transmit and receive communication signals, including data signals and any type of signal, over a network. In one exemplary implementation, the antenna 102 may include a code division multiple access (CDMA) antenna. The antenna 102 may include a dual band CDMA antenna. The dual band CDMA antenna may be configured to operate at multiple, different frequencies. In this manner, the antenna 102 may be capable of transmitting and receiving signals over multiple, different CDMA networks, where each of the CDMA networks may have different operating frequencies and different activation and/or communication protocols. For example, one CDMA network may be configured to operate at a first frequency and another CDMA network may be configured to operate at a second frequency, where the first frequency is different from the second frequency.

The memory 104 may be configured to store multiple identifiers, protocols, instructions and other information. The memory 104 may be coupled to the processor 110 and the memory 104 may provide the information to the processor 110. In one exemplary implementation, the memory 104 may be configured to store multiple mobile equipment identifiers (MEIDs) 106 and multiple activation protocols 108. An MEID includes an identifier that is uniquely recognizable on a network. The MEID enables the network and the network carrier to recognize the mobile device 100 on the network.

In one exemplary implementation, the MEIDs 106 may be pre-defined and stored in the memory 104 prior to activation of the mobile device 100 on any network. The pre-defined MEIDs may be associated with particular CDMA networks and the memory 104 may include other information that associates a specific MEID with a particular CDMA network. Additionally and/or alternatively, one or more new MEIDs 106 may be added to the memory 104.

In one exemplary implementation, the memory 104 may store at least one MEID that is uniquely recognizable on a first CDMA network and may store at least another MEID that is uniquely recognizable on a second CDMA network, where the first CDMA network is different from the second CDMA network. In this manner, the mobile device 100 may use one of the MEIDs 106 that is uniquely recognized on the first CDMA network and may use another of the MEIDs 106 that is uniquely recognized on the second CDMA network. The MEIDs 106 may be reusable such that the mobile device 100 may be configured to switch between the first CDMA network and the second CDMA network, and vice versa, using the MEID recognized by the first CDMA network and using the MEID recognized by the second CDMA network.

The memory 104 may be configured to store multiple activation protocols 108. An activation protocol 108 may include instructions and a protocol format for activating the mobile device 100 on a particular network. For example, each different CDMA network may use a different activation protocol and/or communication protocol to activate and operate a device on its network. The memory 104 may include multiple activation protocols 108, each of which may be associated with a different CDMA network. In this manner, the mobile device 100 may use one of the activation protocols 108 to activate and operate the mobile device 100 on a first CDMA network and may use another activation protocol to activate and operate the mobile device 100 on a second CDMA network, where the first CDMA network is different from the second CDMA network. The activation protocols 108 may be reusable such that the mobile device 100 may be configured to switch between the first CDMA network and the second CDMA network, and vice versa, using the activation protocols that are particular to each of the CDMA networks. The activation protocols 108 may be predefined and stored in the memory 104. Additionally and/or alternatively, the memory 104 may be updated with one or more new activation protocols 108.

The user interface 105 may be configured to provide a display to a user and to enable the user to interact with the mobile device 100. In one exemplary implementation, the user interface 105 may provide an interface to enable the user to select a network from among multiple, different networks on which to activate and operate the mobile device 100. The user interface 105 may be configured to provide options for the multiple, different networks from which to choose. The networks that are available for selection by the user may be ones that are associated with the MEIDs 106 and the activation protocols 108 that are stored in the memory 104 for those particular networks. The user interface 105 be configured to enable the user to select an initial network on which to activate and operate the mobile device 100. Additionally, the user interface 105 may be configured to enable the user to select a different network on which to activate and operate the mobile device 100 after the mobile device 100 has been activated on the initial network.

In one exemplary implementation, the mobile device 100 may be configured to activate on a default network. At a later time, the user interface 105 may enable the user to switch the mobile device 100 to a different network. For example, the mobile device 100 may default to be activated and operated on a first CDMA network. At a later time, the user interface 105 may enable the user to select a different CDMA network on which to activate and operate the mobile device 100.

The processor 110 may be configured to execute instructions to perform various actions. For example, the processor 110 may be configured to execute instructions to control the antenna 102. In one exemplary implementation, the processor 110 may be configured to control the frequency at which the antenna 102 operates. For instance, if the antenna 102 is a dual band CDMA antenna, then the processor may control the frequency at which the antenna operates. The selection of the frequency may be based on the particular network on which the mobile device 100 is going to be activated and operated.

The processor 110 may be configured to execute instructions to control the memory 104. In one exemplary implementation, the processor 110 may be configured to select an appropriate MEID from the MEIDs 106 stored in the memory 104 and to select an appropriate activation protocol from the activation protocols 108 stored in the memory 104 based on which network the mobile device 100 is to be activated and operated. The processor 110 may be configured to use the selected MEID and the selected activation protocol to activate and operate the mobile device 100 on a particular network.

The processor 110 may be configured to execute instructions to control the user interface 105. The processor 110 may be configured to provide the user interface 105 the options of networks from which to choose to activate and operate the mobile device 100. The processor 110 may be configured to process the inputs received by the user interface 105 and to provide output instructions to the user interface 105.

In this manner, the processor 110 may be configured to enable a user to select a network from multiple different networks on which to activate and operate the mobile device 100. The processor 110 may process the input of the selected network and control the memory 104 to select the appropriate MEID and activation protocol for the selected network. The processor 110 may be configured to control the antenna 102 to select the frequency for the selected network. The processor 110 may perform the actions to activate and operate the mobile device 100 on the selected network. For example, the user may select one of multiple, different CDMA networks on which to activate and operate the device. The processor 110 processes the selection received through the user interface 105 and selects an appropriate MEID and activation protocol from the memory 104 and uses the MEID and activation protocol to activate and operate the mobile device 100 on the selected network.

In one exemplary implementation, the processor 110 may be configured to activate the mobile device 100 on a selected network over-the-air. In another exemplary implementation, the processor 110 may be configured to activate the mobile device 100 on a selected network over a wireless local area network.

In another exemplary implementation, the processor 110 may be configured to switch the mobile device 100 from one network to a different network. In this example, the processor 110 may be configured to select a different operating frequency for the antenna 102 and to select a different MEID and a different activation protocol from the memory 104. The processor 110 may use the selected MEID and the selected activation protocol to activate and operate the mobile device 100 on the newly selected network. As part of the process of switching to a new network, the processor 110 may be configured to deactivate the mobile device 100 on the previous network. In this manner, the processor 110 may be configured to enable the user to switch from one CDMA network to a different CDMA network by performing these actions.

In one exemplary implementation, the processor 110 may be configured to enable the mobile device 100 to roam from one CDMA network to a different CDMA network without input from the user.

Figure 2:
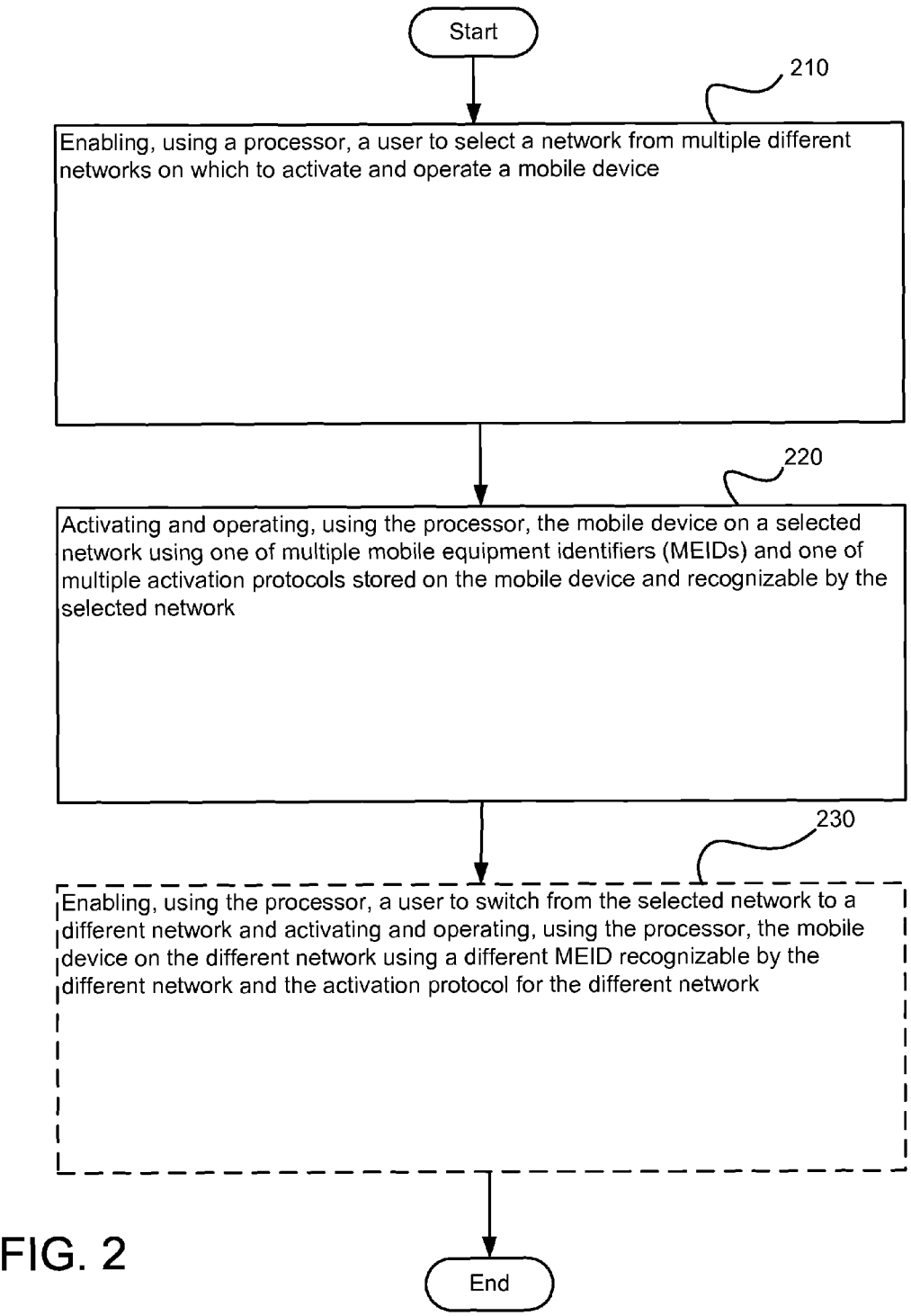
FIG. 2 is an exemplary flowchart illustrating example operations of the mobile device of FIG. 1.

Referring to FIG. 2, a process 200 illustrates example operations of the mobile device 100 of FIG. 1. Process 200 may include enabling, using a processor, a user to select a network from multiple different networks on which to activate and operate a mobile device (210). For example, the processor 110 may be used to enable a user to select a network from multiple different networks on which to activate and operate the mobile device 100. Each of the networks may have different activation and/or communication protocols.

Process 200 also may include activating and operating, using the processor, the mobile device on the selected network using one of multiple mobile equipment identifiers (MEIDs) and one of multiple activation protocols stored on the mobile device and recognizable by the selected network (220). For example, the processor 110 may be configured to activate and operate the mobile device 100 on the selected network using one of multiple MEIDs 106 and one of multiple activation protocols 108 stored in memory 104 and recognizable by the selected network.

Optionally, process 200 may include enabling, using the processor, a user to switch from the selected network to a different network and activating and operating the mobile device on the different network using a different MEID recognizable by the different network and the activation protocol for the different network (230). For example, the processor 110 may be configured to enable the user to switch the mobile device 100 from the selected network to a different network. In this example, the processor 110 would select an MEID uniquely recognizable by the new network and the activation protocol for the new network and use the MEID and the activation protocol to activate and operate the mobile device 100 on the new network.

Figure 3:
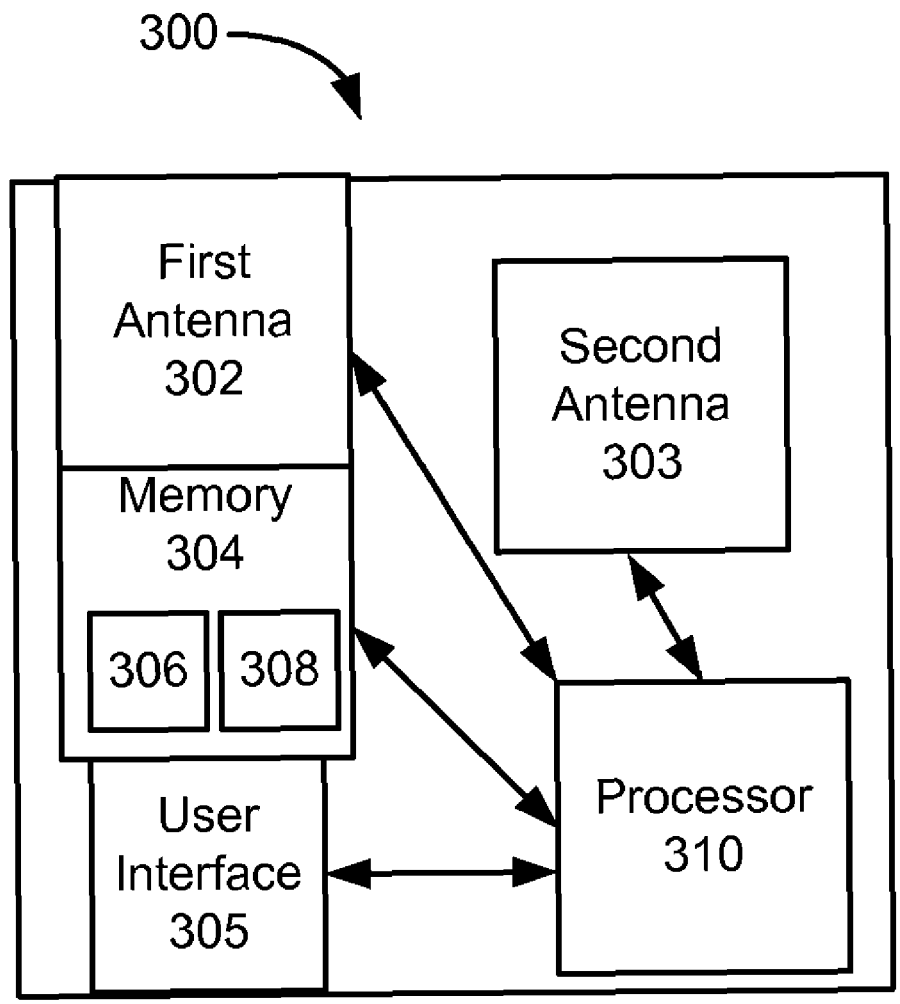
FIG. 3 is an exemplary block diagram of an exemplary mobile device.

Referring now to FIG. 3, an exemplary mobile device 300 is illustrated. The mobile device 300 may include a first antenna 302, a second antenna 303, a memory 304, a user interface 305 and a processor 310. The mobile device 300 may perform all of the same actions and functions as mobile device 100 of FIG. 1 with components having like reference numbers being configured to operate in a same or similar manner. In addition to having the same features and functionality of mobile device 100 of FIG. 1, mobile device 300 also may include the second antenna 303, which may be a different type of antenna than the first antenna 302.

In one exemplary implementation, the second antenna 303 may be a global system for mobile communications (GSM) antenna. The GSM antenna may be a multi-band antenna including a quad band GSM antenna. In this manner, the second antenna 303 may enable the mobile device 300 to be activated and operated on multiple, different GSM networks, each of which may operate at different frequencies.

In one exemplary implementation, the first antenna 302 may be a CDMA antenna and the second antenna 303 may be a GSM antenna. In this manner, the mobile device 300 may be activated and operated on one of multiple different CDMA networks or GSM networks. The user may be enabled to select, using the user interface 305, which type of network to activate and operate the mobile device 300. The memory 304 may store the MEIDs 306 and application protocols 308 for activating and operating the mobile device 300 on multiple different CDMA networks. The memory 304 also may store multiple access point network (APN) configurations to activate and operate the mobile device on multiple different GSM networks, each of which may have different activation and/or communication protocols. The mobile device 300 also may be configured to receive and use different subscriber identity module (SIM) chips, which enable a device to be uniquely recognized on a GSM network.

The processor 310 may be configured to enable the user to select which network to activate and operate the mobile device 300 and to activate and operate the mobile device 300 on the selected network. For example, the user may select, using the user interface 305, to activate and operate the mobile device 300 on a particular GSM network. The processor 310 is configured to recognize the SIM card input into the mobile device by the user and to select the appropriate APN configuration from the memory 304. The processor 310 is configured to control the second antenna 303 such that the second antenna operates at the appropriate frequency for the selected GSM network. In another example, if the user selects a CDMA network, then the processor 310 is configured to perform the actions as discussed above with respect to FIG. 1.

The processor 310 may be configured to enable the user to switch the activation and operation of the mobile device 300 from one network to a different network. For example, the processor 310 may perform the actions to switch the activation and operation of the mobile device 300 from a GSM network to a CDMA network. Additionally, the processor 310 may perform the actions to switch the activation and operation of the mobile device 300 from a CDMA network to a GSM network.

In one exemplary implementation, the processor 310 may enable the mobile device 300 to roam from one type of network to a different type of network without any input from the user. For example, the processor 310 may enable the mobile device 300 to roam from a GSM network to a CDMA network and vice versa, without any input from the user.

Figure 4:
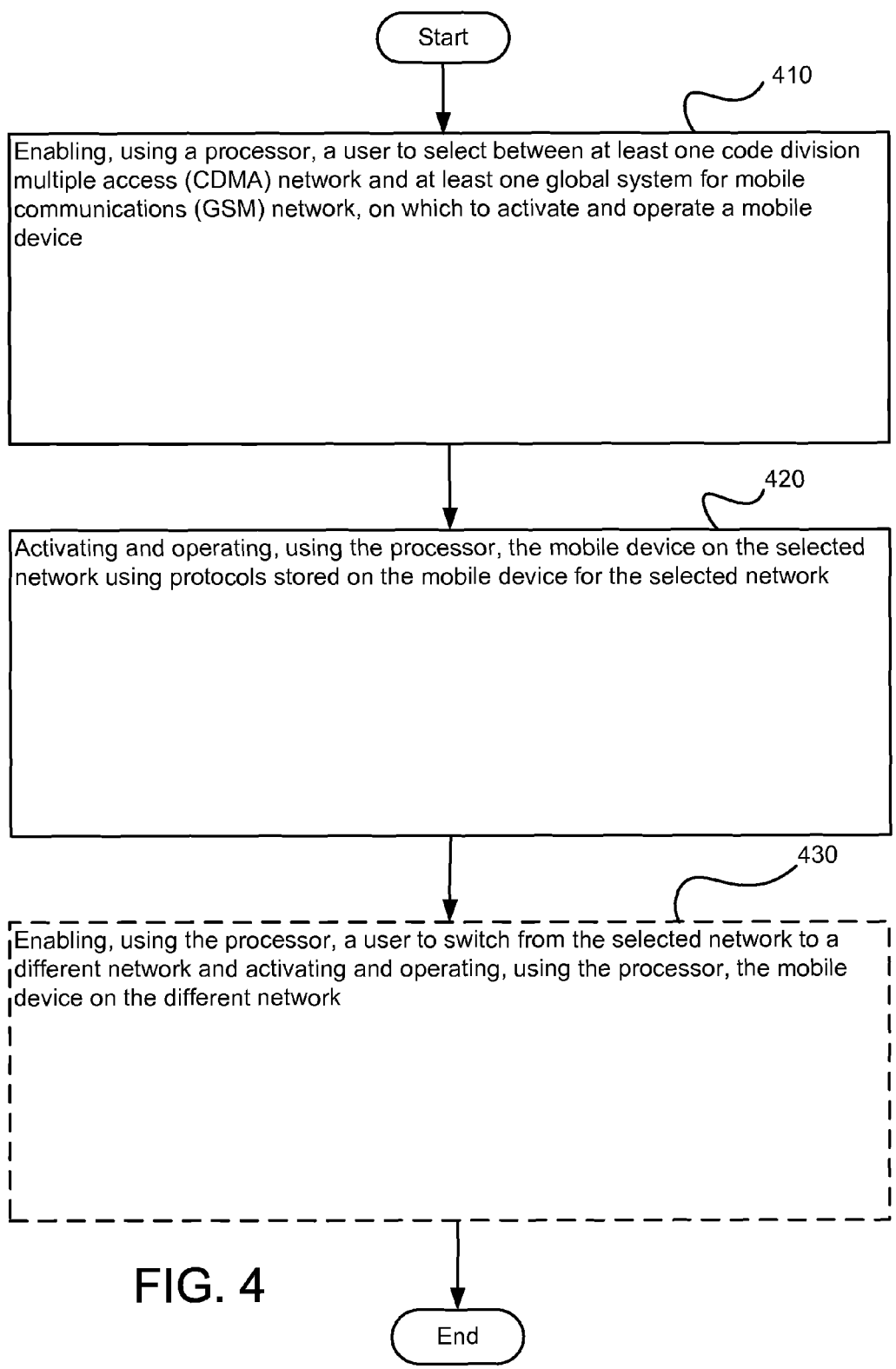
FIG. 4 is an exemplary flowchart illustrating example operations of the mobile device of FIG. 3.

Referring to FIG. 4, a process 400 illustrates example operations of the mobile device 300 of FIG. 3. Process 400 may include enabling, using a processor, a user to select between at least one CDMA network and at least one GSM network, on which to activate and operate a mobile device (410). For example, the processor 310 may be configured to enable a user to select, through the user interface 305, between one or more CDMA network and one or more GSM networks on which to activate and operate the mobile device 300.

Process 400 may include activating and operating, using the processor, the mobile device on the selected network using protocols stored on the mobile device for the selected network (420). For example, the processor 310 may be configured to activate and operate the mobile device 300 on the selected network using the protocols stored in memory 304 for the selected network. The selected network may be a CDMA network or a GSM network.

Process 400 optionally may include enabling, using the processor, a user to switch from the selected network to a different network and activating and operating the mobile device on the different network (430). For example, the processor 310 may be configured to switch the mobile device 300 from a GSM network to a CDMA network or to switch the mobile device 300 from a CDMA network to a GSM network.

Figure 5:
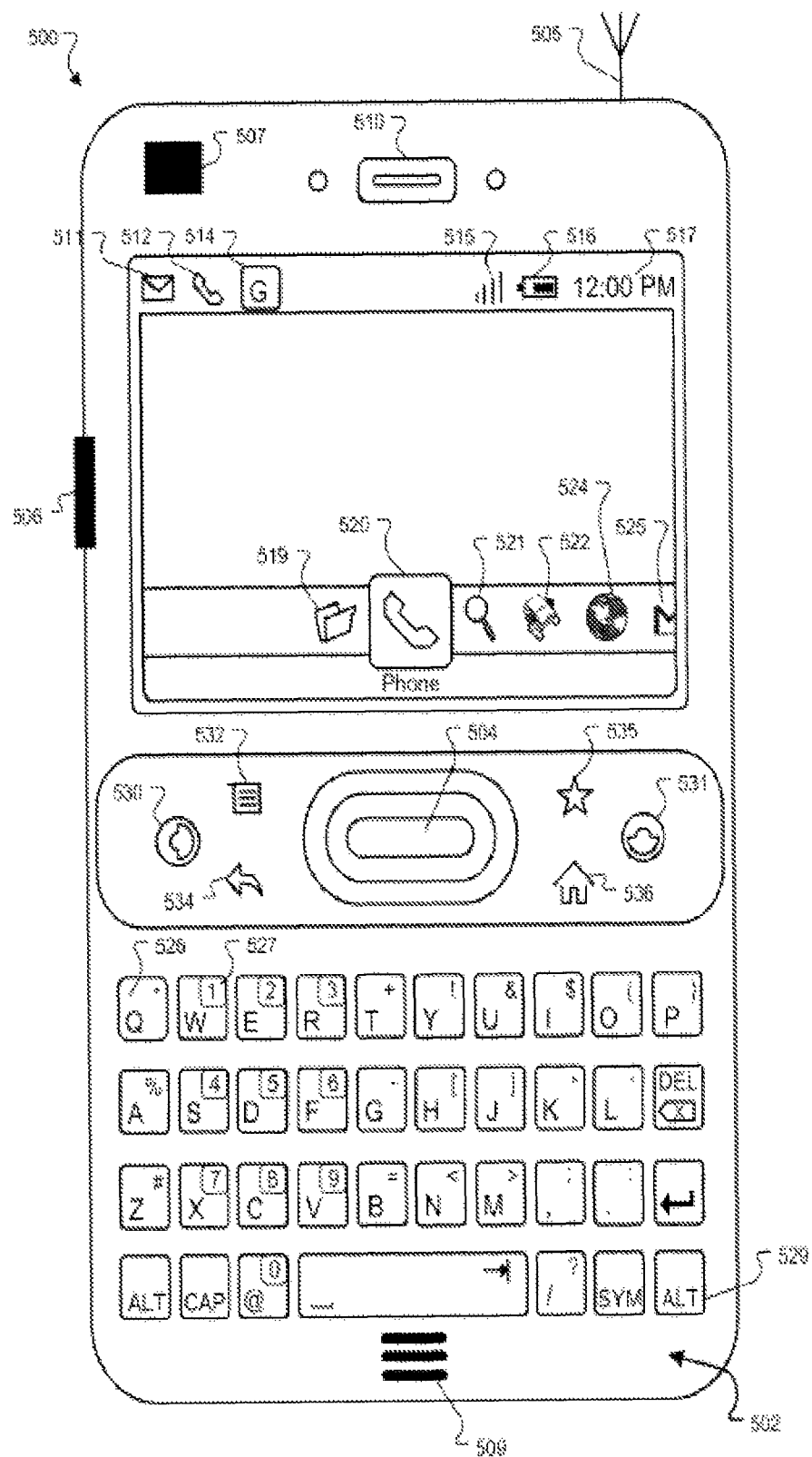
FIG. 5 is a schematic representation of an exemplary mobile device that implements embodiments of the techniques described herein.

Referring now to FIG. 5, the exterior appearance of an exemplary device 500 that implements the features described here is illustrated. Briefly, and among other things, the device 500 includes a processor configured to display notifications regarding events on the device 500, and to permit a user to conveniently "pull down" detail about the events relating to the notifications into an extended view of the events.

In more detail, the hardware environment of the device 500 includes a display 501 for displaying text, images, and video to a user; a keyboard 502 for entering text data and user commands into the device 500; a pointing device 504 for pointing, selecting, and adjusting objects displayed on the display 501; an antenna 505; a network connection 506; a camera 507; a microphone 509; and a speaker 510. Although the device 500 shows an external antenna 505, the device 500 can include an internal antenna, which is not visible to the user.

The display 501 can display video, graphics, images, and text that make up the user interface for the software applications used by the device 500, and the operating system programs used to operate the device 500. Among the possible elements that may be displayed on the display 501 are a new mail indicator 511 that alerts a user to the presence of a new message; an active call indicator 512 that indicates that a telephone call is being received, placed, or is occurring; a data standard indicator 514 that indicates the data standard currently being used by the device 500 to transmit and receive data; a signal strength indicator 515 that indicates a measurement of the strength of a signal received by via the antenna 505, such as by using signal strength bars; a battery life indicator 516 that indicates a measurement of the remaining battery life; or a clock 517 that outputs the current time.

The display 501 may also show application icons representing various applications available to the user, such as a web browser application icon 519, a phone application icon 520, a search application icon 521, a contacts application icon 522, a mapping application icon 524, an email application icon 525, or other application icons. In one example implementation, the display 501 is a quarter video graphics array (QVGA) thin film transistor (TFT) liquid crystal display (LCD), capable of 16-bit or better color.

A user uses the keyboard (or "keypad") 502 to enter commands and data to operate and control the operating system and applications that provide for responding to notification of alerts and responding to messages and the like (and also to a touch screen). The keyboard 502 includes standard keyboard buttons or keys associated with alphanumeric characters, such as keys 526 and 527 that are associated with the alphanumeric characters "Q" and "W" when selected alone, or are associated with the characters "*" and "1" when pressed in combination with key 529. A single key may also be associated with special characters or functions, including unlabeled functions, based upon the state of the operating system or applications invoked by the operating system. For example, when an application calls for the input of a numeric character, a selection of the key 527 alone may cause a "1" to be input.

In addition to keys traditionally associated with an alphanumeric keypad, the keyboard 502 also includes other special function keys, such as an establish call key 530 that causes a received call to be answered or a new call to be originated; a terminate call key 531 that causes the termination of an active call; a drop down menu key 532 that causes a menu to appear within the display 501; a backward navigation key 534 that causes a previously accessed network address to be accessed again; a favorites key 535 that causes an active web page to be placed in a bookmarks folder of favorite sites, or causes a bookmarks folder to appear; a home page key 536 that causes an application invoked on the device 500 to navigate to a predetermined network address; or other keys that provide for multiple-way navigation, application selection, and power and volume control.

The user uses the pointing device 504 to select and adjust graphics and text objects displayed on the display 501 as part of the interaction with and control of the device 500 and the applications invoked on the device 500. The pointing device 504 is any appropriate type of pointing device, and may be a joystick, a trackball, a touch-pad, a camera, a voice input device, a touch screen device implemented in combination with the display 501, or any other input device.

The antenna 505, which can be an external antenna or an internal antenna, is a directional or omni-directional antenna used for the transmission and reception of radiofrequency (RF) signals that implement point-to-point radio communication, wireless local area network (LAN) communication, or location determination. The antenna 505 may facilitate point-to-point radio communication using the Specialized Mobile Radio (SMR), cellular, or Personal Communication Service (PCS) frequency bands, and may implement the transmission of data using any number or data standards. For example, the antenna 505 may allow data to be transmitted between the device 500 and a base station using technologies such as Wireless Broadband (WiBro), Worldwide Interoperability for Microwave ACCess (WiMAX), 5GPP Long Term Evolution (LTE), Ultra Mobile Broadband (UMB), High Performance Radio Metropolitan Network (HIPERMAN), iBurst or High Capacity Spatial Division Multiple Access (HC-SDMA), High Speed OFDM Packet Access (HSOPA), High-Speed Packet Access (HSPA), HSPA Evolution, HSPA+, High Speed Upload Packet Access (HSUPA), High Speed Downlink Packet Access (HSDPA), Generic Access Network (GAN), Time Division-Synchronous Code Division Multiple Access (TD-SCDMA), Evolution-Data Optimized (or Evolution-Data Only)(EVDO), Time Division-Code Division Multiple Access (TD-CDMA), Freedom Of Mobile Multimedia Access (FOMA), Universal Mobile Telecommunications System (UMTS), Wideband Code Division Multiple Access (W-CDMA), Enhanced Data rates for GSM Evolution (EDGE), Enhanced GPRS (EGPRS), Code Division Multiple Access-2000 (CDMA2000), Wideband Integrated Dispatch Enhanced Network (WiDEN), High-Speed Circuit-Switched Data (HSCSD), General Packet Radio Service (GPRS), Personal Handy-Phone System (PHS), Circuit Switched Data (CSD), Personal Digital Cellular (PDC), CDMAone, Digital Advanced Mobile Phone System (D-AMPS), Integrated Digital Enhanced Network (IDEN), Global System for Mobile communications (GSM), DataTAC, Mobitex, Cellular Digital Packet Data (CDPD), Hicap, Advanced Mobile Phone System (AMPS), Nordic Mobile Phone (NMP), Autoradiopuhelin (ARP), Autotel or Public Automated Land Mobile (PALM), Mobiltelefonisystem D (MTD), Offentlig Landmobil Telefoni (OLT), Advanced Mobile Telephone System (AMTS), Improved Mobile Telephone Service (IMTS), Mobile Telephone System (MTS), Push-To-Talk (PTT), or other technologies. Communication via W-CDMA, HSUPA, GSM, GPRS, and EDGE networks may occur, for example, using a QUALCOMM MSM7200A chipset with an QUALCOMM RTR6285® transceiver and PM7540® power management circuit.

The wireless or wired computer network connection 506 may be a modem connection, a local-area network (LAN) connection including the Ethernet, or a broadband wide-area network (WAN) connection such as a digital subscriber line (DSL), cable high-speed internet connection, dial-up connection, T-1 line, T-3 line, fiber optic connection, or satellite connection. The network connection 506 may connect to a LAN network, a corporate or government WAN network, the Internet, a telephone network, or other network. The network connection 506 uses a wired or wireless connector. Example wireless connectors include, for example, an INFRARED DATA ASSOCIATION (IrDA) wireless connector, a Wi-Fi wireless connector, an optical wireless connector, an INSTITUTE OF ELECTRICAL AND ELECTRONICS ENGINEERS (IEEE) Standard 802.11 wireless connector, a BLUETOOTH wireless connector (such as a BLUETOOTH version 1.2 or 5.0 connector), a near field communications (NFC) connector, an orthogonal frequency division multiplexing (OFDM) ultra wide band (UWB) wireless connector, a time-modulated ultra wide band (TM-UWB) wireless connector, or other wireless connector. Example wired connectors include, for example, a IEEE-1394 FIREWIRE connector, a Universal Serial Bus (USB) connector (including a mini-B USB interface connector), a serial port connector, a parallel port connector, or other wired connector. In another implementation, the functions of the network connection 506 and the antenna 505 are integrated into a single component.

The camera 507 allows the device 500 to capture digital images, and may be a scanner, a digital still camera, a digital video camera, other digital input device. In one example implementation, the camera 507 is a 5 mega-pixel (MP) camera that utilizes a complementary metal-oxide semiconductor (CMOS).

The microphone 509 allows the device 500 to capture sound, and may be an omni-directional microphone, a unidirectional microphone, a bidirectional microphone, a shotgun microphone, or other type of apparatus that converts sound to an electrical signal. The microphone 509 may be used to capture sound generated by a user, for example when the user is speaking to another user during a telephone call via the device 500. Conversely, the speaker 510 allows the device to convert an electrical signal into sound, such as a voice from another user generated by a telephone application program, or a ring tone generated from a ring tone application program. Furthermore, although the device 500 is illustrated in FIG. 5 as a handheld device, in further implementations the device 500 may be a laptop, a workstation, a midrange computer, a mainframe, an embedded system, telephone, desktop PC, a tablet computer, a PDA, or other type of computing device.

Figure 6:
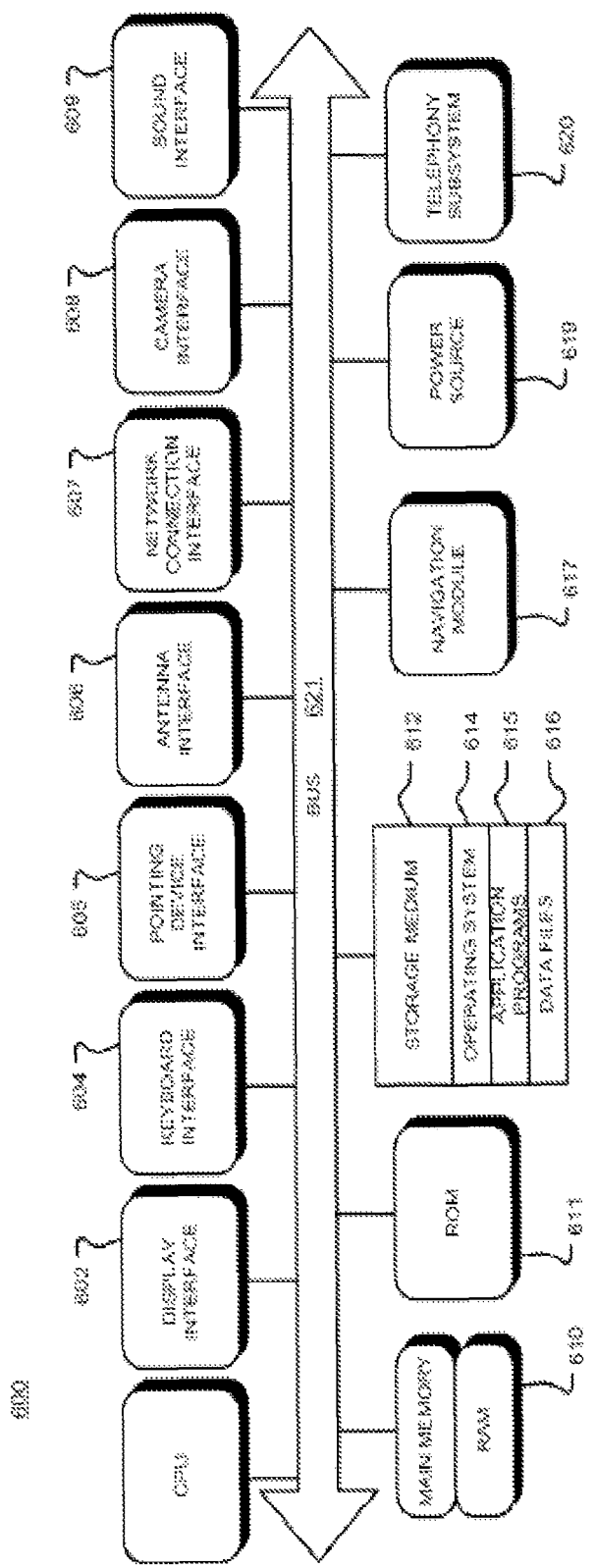
FIG. 6 is a block diagram illustrating the internal architecture of the device of FIG. 5.

FIG. 6 is a block diagram illustrating an internal architecture 600 of the device 500. The architecture includes a central processing unit (CPU) 601 where the computer instructions that comprise an operating system or an application are processed; a display interface 602 that provides a communication interface and processing functions for rendering video, graphics, images, and texts on the display 501, provides a set of built-in controls (such as buttons, text and lists), and supports diverse screen sizes; a keyboard interface 604 that provides a communication interface to the keyboard 502; a pointing device interface 605 that provides a communication interface to the pointing device 504; an antenna interface 606 that provides a communication interface to the antenna 505; a network connection interface 607 that provides a communication interface to a network over the computer network connection 506; a camera interface 608 that provides a communication interface and processing functions for capturing digital images from the camera 507; a sound interface 609 that provides a communication interface for converting sound into electrical signals using the microphone 509 and for converting electrical signals into sound using the speaker 510; a random access memory (RAM) 610 where computer instructions and data are stored in a volatile memory device for processing by the CPU 601; a read-only memory (ROM) 611 where invariant low-level systems code or data for basic system functions such as basic input and output (I/O), startup, or reception of keystrokes from the keyboard 502 are stored in a non-volatile memory device; a storage medium 612 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files that comprise an operating system 614, application programs 615 (including, for example, a web browser application, a widget or gadget engine, and or other applications, as necessary) and data files 616 are stored; a navigation module 617 that provides a real-world or relative position or geographic location of the device 500; a power source 619 that provides an appropriate alternating current (AC) or direct current (DC) to power components; and a telephony subsystem 620 that allows the device 500 to transmit and receive sound over a telephone network. The constituent devices and the CPU 601 communicate with each other over a bus 621.

The CPU 601 can be one of a number of computer processors. In one arrangement, the computer CPU 601 is more than one processing unit. The RAM 610 interfaces with the computer bus 621 so as to provide quick RAM storage to the CPU 601 during the execution of software programs such as the operating system application programs, and device drivers. More specifically, the CPU 601 loads computer-executable process steps from the storage medium 612 or other media into a field of the RAM 610 in order to execute software programs. Data is stored in the RAM 610, where the data is accessed by the computer CPU 601 during execution. In one example configuration, the device 500 includes at least 128 MB of RAM, and 256 MB of flash memory.

The storage medium 612 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 500 to access computer-executable process steps, application programs and the like, stored on removable and non-removable memory media, to off-load data from the device 500, or to upload data onto the device 500.

A computer program product is tangibly embodied in storage medium 612, a machine-readable storage medium. The computer program product includes instructions that, when read by a machine, operate to cause a data processing apparatus to store image data in the mobile device. In some embodiments, the computer program product includes instructions that generate notifications about alerts such as newly arriving messages on the device.

The operating system 614 may be a LINUX-based operating system such as the GOOGLE mobile device platform; APPLE MAC OS X; MICROSOFT WINDOWS NT/WINDOWS 2000/WINDOWS XP/WINDOWS MOBILE; a variety of UNIX-flavored operating systems; or a proprietary operating system for computers or embedded systems. The application development platform or framework for the operating system 614 may be: BINARY RUNTIME ENVIRONMENT FOR WIRELESS (BREW); JAVA Platform, Micro Edition (JAVA ME) or JAVA 2 Platform, Micro Edition (J2ME) using the SUN MICROSYSTEMS JAVASCRIPT programming language; PYTHON FLASH LITE, or MICROSOFT.NET Compact, or another appropriate environment.

The device stores computer-executable code for the operating system 614, and the application programs 615 such as an email, instant messaging, a video service application, a mapping application word processing, spreadsheet, presentation, gaming, mapping, web browsing, JAVASCRIPT engine, or other applications. For example, one implementation may allow a user to access the GOOGLE GMAIL email application, the GOOGLE TALK instant messaging application, a YOUTUBE video service application, a GOOGLE MAPS or GOOGLE EARTH mapping application, or a GOOGLE PICASA imaging editing and presentation application. The application programs 615 may also include a widget or gadget engine, such as a TAFRI widget engine, a MICROSOFT gadget engine such as the WINDOWS SIDEBAR gadget engine or the KAPSULES gadget engine, a YAHOO! widget engine such as the KONFABULTOR widget engine, the APPLE DASHBOARD widget engine, the GOOGLE gadget engine, the KLIPFOLIO widget engine, an OPERA widget engine, the WIDSETS widget engine, a proprietary widget or gadget engine, or other widget or gadget engine the provides host system software for a physically-inspired applet on a desktop.

Although it is possible to provide for notifications and interactions with messages and other events using the above-described implementation, it is also possible to implement the functions according to the present disclosure as a dynamic link library (DLL), or as a plug-in to other application programs such as an Internet web-browser such as the FOXFIRE web browser, the APPLE SAFARI web browser or the MICROSOFT INTERNET EXPLORER web browser.

The navigation module 617 may determine an absolute or relative position of the device, such as by using the Global Positioning System (GPS) signals, the GLObal NAvigation Satellite System (GLONASS), the Galileo positioning system, the Beidou Satellite Navigation and Positioning System, an inertial navigation system, a dead reckoning system, or by accessing address, internet protocol (IP) address, or location information in a database. The navigation module 617 may also be used to measure angular displacement, orientation, or velocity of the device 500, such as by using one or more accelerometers.

Figure 7:
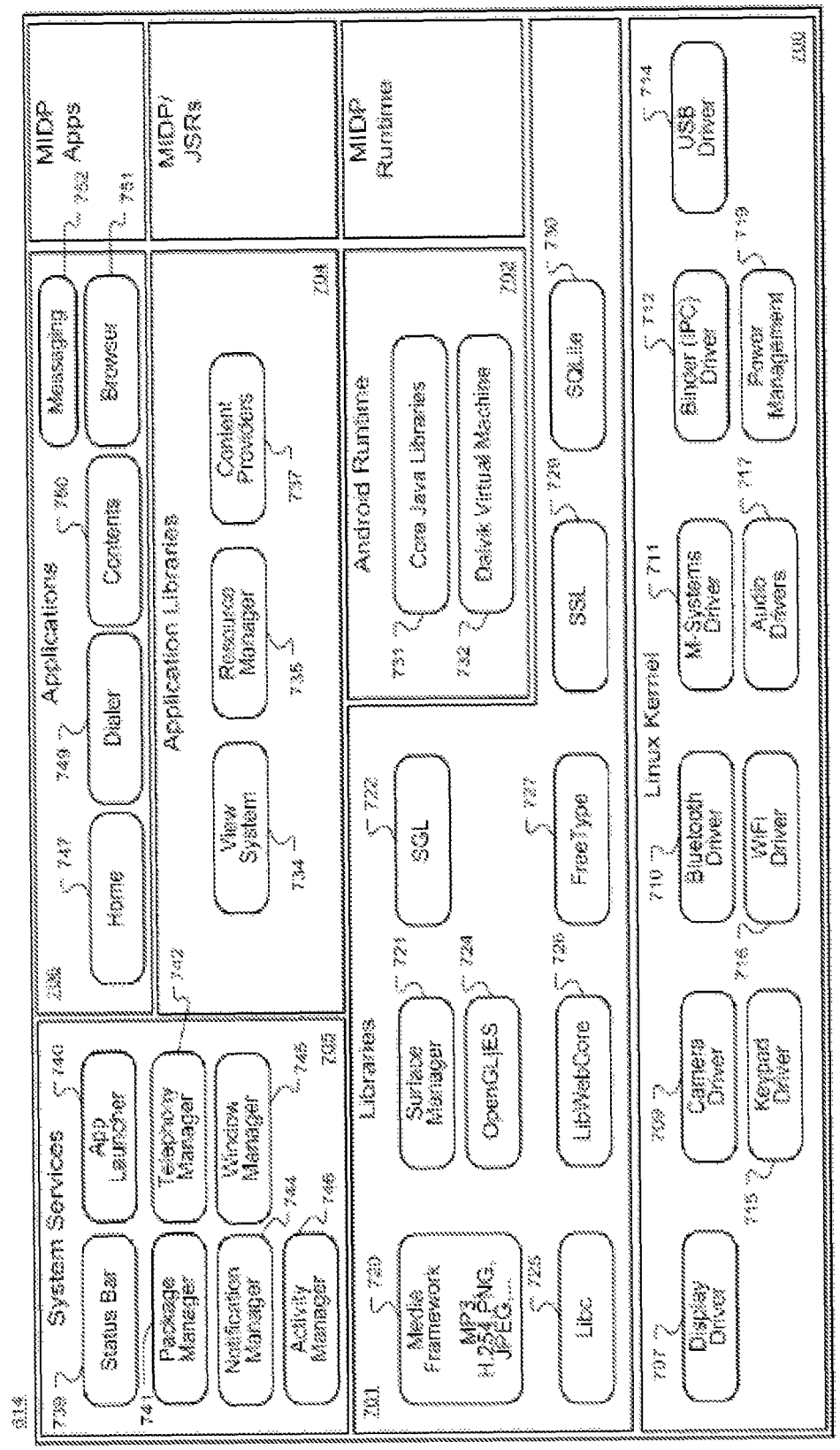
FIG. 7 is a block diagram illustrating exemplary components of the operating system used by the device of FIG. 5.

FIG. 7 is a block diagram illustrating exemplary components of the operating system 614 used by the device 500, in the case where the operating system 614 is the GOOGLE mobile device platform. The operating system 614 invokes multiple processes, while ensuring that the associated phone application is responsive, and that wayward applications do not cause a fault (or "crash") of the operating system. Using task switching, the operating system 614 allows for the switching of applications while on a telephone call, without losing the state of each associated application. The operating system 614 may use an application framework to encourage reuse of components, and provide a scalable user experience by combining pointing device and keyboard inputs and by allowing for pivoting. Thus, the operating system can provide a rich graphics system and media experience, while using an advanced, standards-based web browser.

The operating system 614 can generally be organized into six components: a kernel 700, libraries 701, an operating system runtime 702, application libraries 704, system services 705, and applications 706. The kernel 700 includes a display driver 707 that allows software such as the operating system 614 and the application programs 715 to interact with the display 501 via the display interface 602, a camera driver 709 that allows the software to interact with the camera 507; a BLUETOOTH driver 710; a M-Systems driver 711; a binder (IPC) driver 712, a USB driver 714 a keypad driver 715 that allows the software to interact with the keyboard 502 via the keyboard interface 604; a WiFi driver 716; audio drivers 717 that allow the software to interact with the microphone 509 and the speaker 510 via the sound interface 609; and a power management component 719 that allows the software to interact with and manage the power source 719.

The BLUETOOTH driver, which in one implementation is based on the BlueZ BLUETOOTH stack for LINUX-based operating systems, provides profile support for headsets and hands-free devices, dial-up networking, personal area networking (PAN), or audio streaming (such as by Advance Audio Distribution Profile (A2DP) or AudioNideo Remote Control Profile (AVRCP). The BLUETOOTH driver provides JAVA bindings for scanning, pairing and unpairing, and service queries.

The libraries 701 include a media framework 720 that supports standard video, audio and still-frame formats (such as Moving Picture Experts Group (MPEG)-4, H.264, MPEG-1 Audio Layer-3 (MP3), Advanced Audio Coding (MC), Adaptive Multi-Rate (AMR), Joint Photographic Experts Group (JPEG), and others) using an efficient JAVA Application Programming Interface (API) layer; a surface manager 721; a simple graphics library (SGL) 722 for two-dimensional application drawing; an Open Graphics Library for Embedded Systems (OpenGL ES) 724 for gaming and three-dimensional rendering; a C standard library (LIBC) 725; a LIBWEBCORE library 726; a FreeType library 727; an SSL 729; and an SQLite library 730.

The operating system runtime 702 includes core JAVA libraries 731, and a Dalvik virtual machine 732. The Dalvik virtual machine 732 is a custom, virtual machine that runs a customized file format (.DEX).

The operating system 614 can also include Mobile Information Device Profile (MIDP) components such as the MIDP JAVA Specification Requests (JSRs) components, MIDP runtime, and MIDP applications as shown in FIG. 7. The MIDP components can support MIDP applications running on the device 500.

With regard to graphics rendering, a system-wide composer manages surfaces and a frame buffer and handles window transitions, using the OpenGL ES 724 and two-dimensional hardware accelerators for its compositions.

The Dalvik virtual machine 732 may be used with an embedded environment, since it uses runtime memory very efficiently, implements a CPU-optimized bytecode interpreter, and supports multiple virtual machine processes per device. The custom file format (.DEX) is designed for runtime efficiency, using a shared constant pool to reduce memory, read-only structures to improve cross-process sharing, concise, and fixed-width instructions to reduce parse time, thereby allowing installed applications to be translated into the custom file format at build-time. The associated bytecodes are designed for quick interpretation, since register-based instead of stack-based instructions reduce memory and dispatch overhead, since using fixed width instructions simplifies parsing, and since the 16-bit code units minimize reads.

The application libraries 704 include a view system 734, a resource manager 735, and content providers 737. The system services 705 includes a status bar 739; an application launcher 740; a package manager 741 that maintains information for all installed applications; a telephony manager 742 that provides an application level JAVA interface to the telephony subsystem 620; a notification manager 744 that allows all applications access to the status bar and on-screen notifications, such as in the manners discussed in the embodiments above; a window manager 745 that allows multiple applications with multiple windows to share the display 501; and an activity manager 746 that runs each application in a separate process, manages an application life cycle, and maintains a cross-application history.

The applications 706 include a home application 747, a dialer application 749, a contacts application 750, a browser application 751, and a messaging application 752. The messaging application 752 may receive and send messages by a number of mechanisms such as e-mail, voice mail, and text message, and may interaction with the notification manager 744 to alert a user when new messages arrive.

The telephony manager 742 provides event notifications (such as phone state, network state, Subscriber Identity Module (SIM) status, or voicemail status), allows access to state information (such as network information, SIM information, or voicemail presence), initiates calls, and queries and controls the call state. The browser application 751 renders web pages in a full, desktop-like manager, including navigation functions. Furthermore, the browser application 751 allows single column, small screen rendering, and provides for the embedding of HTML views into other applications.

Figure 8:
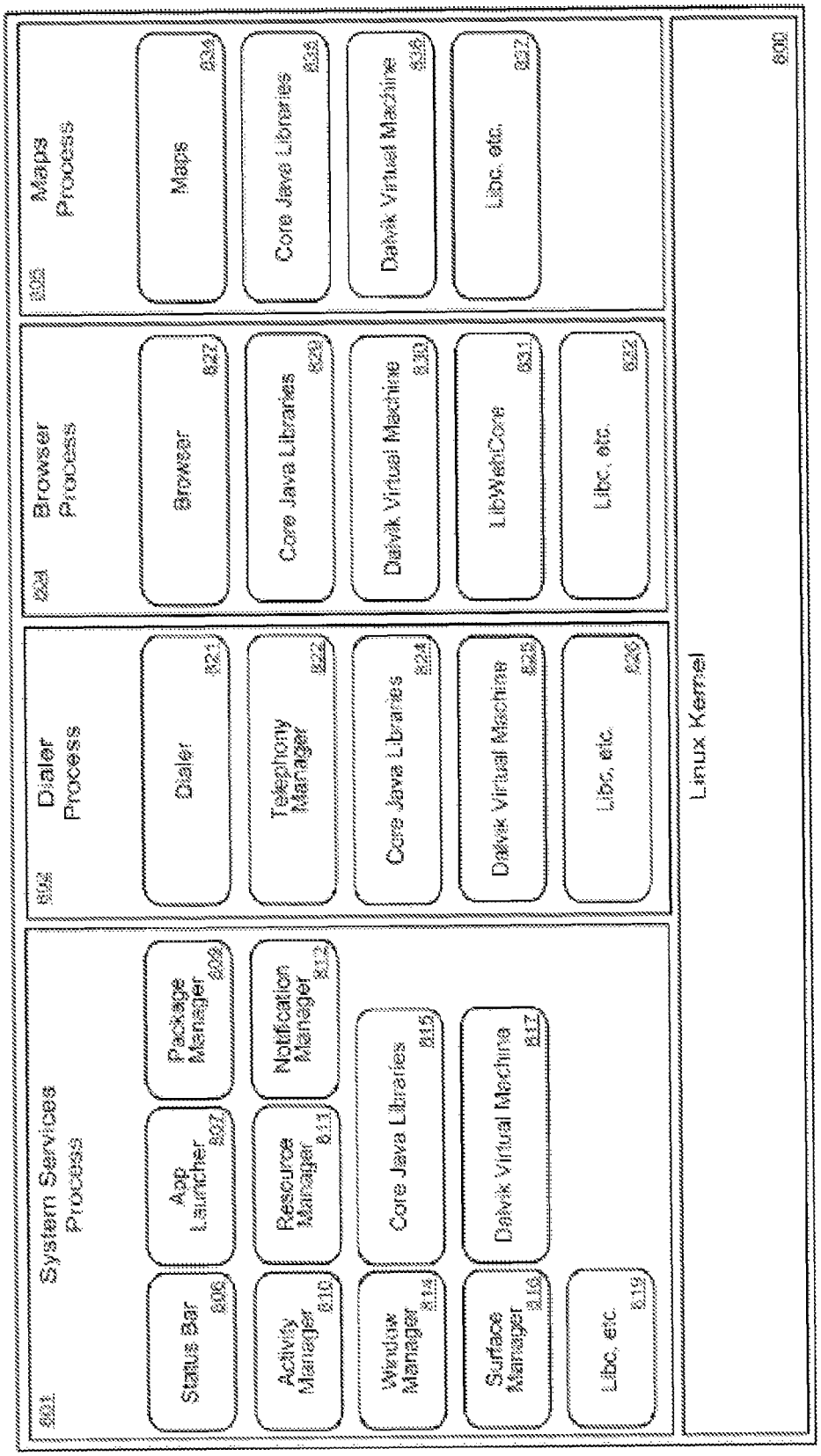
FIG. 8 is a block diagram illustrating exemplary processes implemented by the operating system kernel of FIG. 7.

FIG. 8 is a block diagram illustrating exemplary processes implemented by the operating system kernel 800. Generally, applications and system services run in separate processes, where the activity manager 746 runs each application in a separate process and manages the application life cycle. The applications run in their own processes, although many activities or services can also run in the same process. Processes are started and stopped as needed to run an application's components, and processes may be terminated to reclaim resources. Each application is assigned its own process, whose name is the application's package name, and individual parts of an application can be assigned another process name.

Some processes can be persistent. For example, processes associated with core system components such as the surface manager 816, the window manager 814, or the activity manager 810 can be continuously executed while the device 500 is powered. Additionally, some application-specific process can also be persistent. For example, processes associated with the dialer application 821, may also be persistent.

The processes implemented by the operating system kernel 800 may generally be categorized as system services processes 801, dialer processes 802, browser processes 804, and maps processes 805. The system services processes 801 include status bar processes 806 associated with the status bar 739; application launcher processes 807 associated with the application launcher 740; package manager processes 809 associated with the package manager 741; activity manager processes 810 associated with the activity manager 746; resource manager processes 811 associated with a resource manager 811 that provides access to graphics, localized strings, and XML layout descriptions; notification manager processes 812 associated with the notification manager 744; window manager processes 814 associated with the window manager 745; core JAVA libraries processes 815 associated with the core JAVA libraries 731; surface manager processes 816 associated with the surface manager 721; Dalvik virtual machine processes 817 associated with the Dalvik virtual machine 732, and LIBC processes 819 associated with the LIBC library 725.

The dialer processes 802 include dialer application processes 821 associated with the dialer application 749; telephony manager processes 822 associated with the telephony manager 742; core JAVA libraries processes 824 associated with the core JAVA libraries 731; Dalvik virtual machine processes 825 associated with the Dalvik Virtual machine 732; and LIBC processes 826 associated with the LIBC library 725. The browser processes 804 include browser application processes 827 associated with the browser application 751; core JAVA libraries processes 829 associated with the core JAVA libraries 731; Dalvik virtual machine processes 830 associated with the Dalvik virtual machine 732; LIBWEBCORE processes 831 associated with the LIBWEBCORE library 726; and LIBC processes 832 associated with the LIBC library 725.

The maps processes 805 include maps application processes 834, core JAVA libraries processes 835, Dalvik virtual machine processes 836, and LIBC processes 837. Notably, some processes, such as the Dalvik virtual machine processes, may exist within one or more of the systems services processes 801, the dialer processes 802, the browser processes 804, and the maps processes 805.

Figure 9:
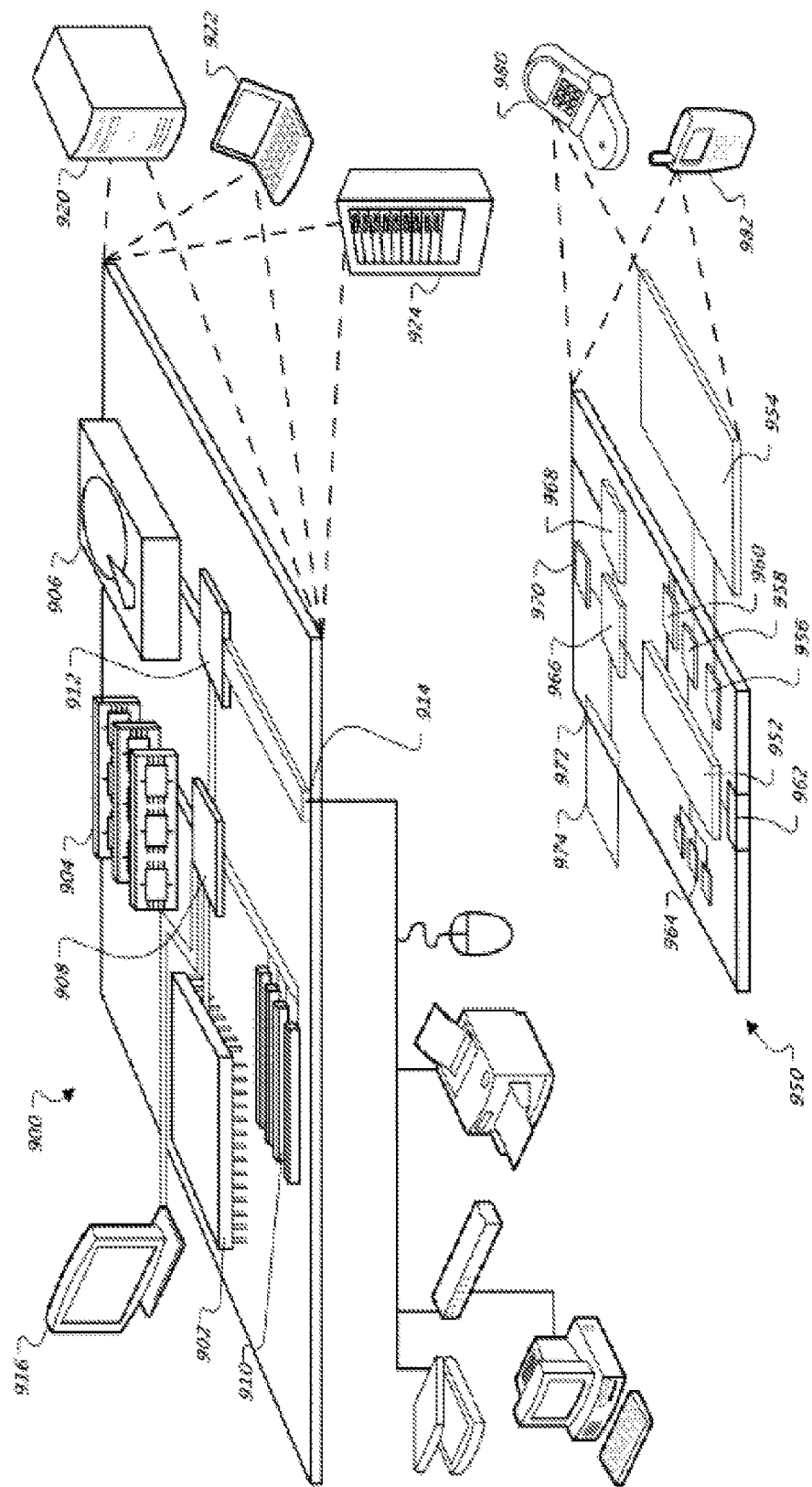
FIG. 9 shows an example of a computer device and a mobile computer device that can be used to implement the techniques described here.

FIG. 9 shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. Aclient and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An apparatus comprising:
   a code division multiple access (CDMA) antenna that is arranged and configured to transmit and receive communication signals;
   a global system for mobile communications (GSM) anenna;
   a memory that is configured to:
      store multiple mobile equipment identifiers (MEIDs), multiple activation protocols and instructions, wherein each MEID comprises an identifier that is uniquely recognizable on one of a plurality of networks and wherein the activation protocols comprise protocols for uniquely activating the apparatus on one of a plurality of different networks each of which have different communication protocols,
      store multiple access point network (APN) configurations, wherein each of the APN configurations comprises protocols for uniquely activating the apparatus on one of a plurality of different GSM networks each of which has different communication protocols; and
   a processor that is operably coupled to the CDMA antenna, the GSM antenna and to the memory and that is arranged and configured to execute the instructions stored on the memory to:
      enable a user to select a network from the multiple different networks on which to activate and operate the apparatus,
      activate and operate the apparatus on a selected network using one of the MEIDs recognizable by the selected network and the activation protocol for the selected network,
      enable the user to switch from the selected network to a GSM network on which to activate and operate the apparatus,
      recognize a presence of a subscriber identity module (SIM) chip associated with a specific GSM network, and
      activate and operate the apparatus on the specific GSM network using the APN configuration for the specific GSM network.

2. The apparatus of claim 1 wherein:
   the CDMA antenna comprises a dual band CDMA antenna that is configured to operate at multiple different frequencies; and
   the processor is configured to execute the instructions stored on the memory to operate the dual band CDMA antenna at a frequency for operation on the selected network.

3. The apparatus of claim 1 wherein the processor is configured to execute the instructions stored on the memory to activate the apparatus on the selected network over-the-air.

4. The apparatus of claim 1 wherein the processor is configured to execute the instructions stored on the memory to activate the apparatus on the selected network over a wireless local area network.

5. The apparatus of claim 1 wherein the processor is configured to execute instructions stored on the memory to:
   enable a user to switch from the selected network to a different network; and
   activate and operate the apparatus on the different network using a different MEID of the MEIDs recognizable by the different network and the activation protocol for the different network.

6. The apparatus of claim 5 wherein the selected network comprises a first CDMA network and the different network comprises a second CDMA network, wherein the second CDMA network is different from the first CDMA network.

7. The apparatus of claim 1 wherein the GSM antenna comprises a quad band GSM antenna.

8. An apparatus comprising:
   a first antenna that is arranged and configured to transmit and receive communication signals on at least a first network;
   a second antenna that is arranged and configured to transmit and receive communication signals on at least a second network, wherein the second network is a different network than the first network and the second network has a different communication protocol than the first network and wherein the second antenna comprises a global system for mobile communications (GSM) antenna;
   a memory that is configured to store protocols and instructions to activate and operate the apparatus on the first network and the second network, the memory storing multiple access point network (APN) configurations, wherein each of the APN configurations comprises protocols for uniquely activating the apparatus on one of a plurality of different GSM networks each of which has different communication protocols and the memory storing muliple mobile equipment identifiers (MEIDs), wherein each MEID comprises an identifier that is uniquely recognizable on one of a plurality of networks; and
   a processor that is operably coupled to the first antenna, the second antenna and the memory and that is arranged and configured to execute the instructions stored on the memory to:
      enable a user to select one of the first network and the second network on which to activate and operate the apparatus,
      activate and operate on the selected network using the protocols for the selected network,
      enable the user to switch from the selected network to a GSM network,
      recognize a presence of a subscriber identity module (SIM) chip associated with a specific GSM network, and
      activate and operate the apparatus on the specific GSM network using the APN configuration for the specific GSM network.

9. The apparatus of claim 8 wherein:
   the first antenna comprises a code division multiple access (CDMA) antenna and the processor is configured to activate and operate the apparatus on the selected network using one of the MEIDs recognizable by the selected network.

10. The apparatus of claim 8 wherein the processor is configured to execute instructions stored on the memory to:
   enable a user to switch from the selected network to a different network from the first network and the second network; and
   activate and operate the apparatus on the different network.

11. The apparatus of claim 10 wherein the selected network comprises a code division multiple access (CDMA) network and the different network comprises a global system for mobile communications (GSM) network.

12. The apparatus of claim 10 wherein the selected network comprises a global system for mobile communications (GSM) network and the different network comprises a code division multiple access (CDMA) network.

13. A non-transitory recordable storage medium having recorded and stored thereon instructions that, when executed, perform the actions of:
  enabling a user to select a network from multiple different networks, each of which have different communication protocols, on which to activate and operate a mobile device;
  activating and operating the mobile device on a selected network using one of multiple mobile equipment identifiers (MEIDs) and one of multiple activation protocols stored on the mobile device and recognizable by the selected network;
  enabling the user to switch from the selected network to a global system for mobile communications (GSM) network;
  recognizing a presence of a subscriber identity module (SIM) chip associated with a specific GSM network; and
  activating and operating the mobile device on the specific GSM network using one of multiple access point network (APN) configurations for the specific GSM network, wherein each of the APN configurations comprises protocols for uniquely activating the mobile device on one of a plurality of GSM networks each of which has different communication protocols.

14. The recordable storage medium of claim 13 wherein the instructions that, when executed, perform the action of activating and operating the mobile device comprise instructions that, when executed, perform the action of activating the mobile device on the selected network over-the-air.

15. The recordable storage medium of claim 13 wherein the instructions that, when executed, perform the action of activating and operating the mobile device comprise instructions that, when executed, perform the action of activating the mobile device on the selected network over a wireless local area network.

16. The recordable storage medium of claim 13 wherein the selected network comprises a code division multiple access (CDMA) network.

17. The recordable storage medium of claim 13 further comprising instructions that, when executed, perform the actions of:
  enabling a user to switch from the selected network to a different network; and
  activating and operating the mobile device on the different network using a different MEID recognizable by the different network and the activation protocol for the different network.

18. The recordable storage medium of claim 17 wherein the selected network comprises a first code division multiple access (CDMA) network and the different network comprises a second CDMA network, wherein the second CDMA network is different from the first CDMA network.

19. A method, comprising:
  enabling, using a processor, a user to select a network from multiple different networks, each of which have different communication protocols, on which to activate and operate a mobile device;
  activating and operating, using the processor, the mobile device on a selected network using one of multiple mobile equipment identifiers (MEIDs) and one of multiple activation protocols stored on the mobile device and recognizable by the selected network;
  enabling, using the processor, the user to switch from the selected network to a global system for mobile communications (GSM) network;
  recognizing, using the processor, a presence of a subscriber identity module (SIM) chip associated with a specific GSM network; and
  activating and operating, using the processor, the mobile device on the specific GSM network using one of multiple access point network (APN) configurations for the specific GSM network, wherein each of the APN configurations comprises protocols for uniquely activating the mobile device on one of a plurality of GSM networks each of which has different communication protocols.

20. The method of claim 19 wherein activating and operating the mobile device comprises activating, using the processor, the mobile device on the selected network over-the-air.

21. The method of claim 19 wherein activating and operating the mobile device comprises activating, using the processor, the mobile device on the selected network over a wireless local area network.

22. The method of claim 19 wherein the selected network comprises a code division multiple access (CDMA) network.

23. The method of claim 19 further comprising:
  enabling, using the processor, a user to switch from the selected network to a different network; and
  activating and operating, using the processor, the mobile device on the different network using a different MEID recognizable by the different network and the activation protocol for the different network.

24. The method of claim 23 wherein the selected network comprises a first code division multiple access (CDMA) network and the different network comprises a second CDMA network, wherein the second CDMA network is different from the first CDMA network.

25. A non-transitory recordable storage medium having recorded and stored thereon instructions that, when executed, perform the actions of:
  enabling a user to select between at least one code division multiple access (CDMA) network and at least one global system for mobile communications (GSM) network, on which to activate and operate a mobile device;
  activating and operating the mobile device on the selected network using protocols and identifiers stored on the mobile device for the selected network, wherein the identifiers include multiple mobile equipment identifiers (MEIDs) and each MEID comprises an identifier that is uniquely recognizable on one of a plurality of networks;
  enabling the user to switch from the selected network to a GSM network;
  recognizing a presence of a subscriber identity module (SIM) chip associated with a specific GSM network; and
  activating and operating the mobile device on the specific GSM network using one of multiple access point network (APN) configurations for the specific GSM network, wherein each of the APN configurations comprises protocols for uniquely activating the mobile device on one of a plurality of GSM networks each of which has different communication protocols.

26. The recordable storage medium of claim 25 further comprising instructions that, when executed, performs the actions of:

enabling a user to switch from the selected network to a different network; and activating and operating the mobile device on the different network.

27. The recordable storage medium of claim 26 wherein the selected network comprises the CDMA network and the different network comprises the GSM network.

28. The recordable storage medium of claim 26 wherein the selected network comprises the GSM network and the different network comprises the CDMA network.

29. A method, comprising:

enabling, using a processor, a user to select between at least one code division multiple access (CDMA) network and at least one global system for mobile communications (GSM) network, on which to activate and operate a mobile device;

activating and operating, using the processor, the mobile device on the selected network using protocols and identifiers stored on the mobile device for the selected network, wherein the identifiers include multiple mobile equipment identifiers (MEIDs) and each MEID comprises an identifier that is uniquely recognizable on one of a plurality of networks;

enabling, using the processor, the user to switch from the selected network to a GSM network;

recognizing, using the processor, a presence of a subscriber identity module (SIM) chip associated with a specific GSM network; and activating and operating, using the processor, the mobile device on the specific GSM network using one of multiple access point network (APN) configurations for the specific GSM network, wherein each of the APN configurations comprises protocols for uniquely activating the mobile device on one of a plurality of GSM networks each of which has different communication protocols.

30. The method of claim 29 further comprising:

enabling, using the processor, a user to switch from the selected network to a different network; and activating and operating, using the processor, the mobile device on the different network.

31. The method of claim 30 wherein the selected network comprises the CDMA network and the different network comprises the GSM network.

32. The method of claim 30 wherein the selected network comprises the GSM network and the different network comprises the CDMA network.

\* \* \* \* \*

UNITED STATES PATENT AND TRADEMARK OFFICE
CERTIFICATE OF CORRECTION

PATENT NO. : 8,249,649 B2  
APPLICATION NO. : 12/829909  
DATED : August 21, 2012  
INVENTOR(S) : Erick Tseng Page 1 of 1

It is certified that error appears in the above-identified patent and that said Letters Patent is hereby corrected as shown below:

In column 21, line 18, in claim 1, delete "anenna;" and insert -- antenna; --, therefor.

In column 22, line 35, in claim 8, delete "muliple" and insert -- multiple --, therefor.

Signed and Sealed this
Thirteenth Day of November, 2012

David J. Kappos
*Director of the United States Patent and Trademark Office*